3,501,529
19-SUBSTITUTED B-NORTESTOSTERONES

Francis Pfeiffer, Delran, N.J., assignor to Smith Kline & French Laboratories, Philadelphia, Pa., a corporation of Pennsylvania
No Drawing. Filed Nov. 18, 1966, Ser. No. 595,338
Int. Cl. C07c 49/00, 69/02, 69/00
U.S. Cl. 260—586        4 Claims

ABSTRACT OF THE DISCLOSURE 19-halo-B-nortestosterones, prepared by reaction of a lithium halide with a 19-p-toluenesulfonyloxy-B-nortestosterone, are disclosed. The products are androgenic agents. 17-keto and hydroxy compounds, and esters and ethers are also disclosed.

---

This invention relates to B-nortestosterone compounds having androgenic activity. In particular, the invention relates to 19-halo-B-nortestosterones having androgenic activity and to 19-p-toluenesulfonyloxy-B-nortestosterone compounds which are intermediates useful in preparing the 19-halo compounds.

The compounds of the invention are represented by the following structural formula:

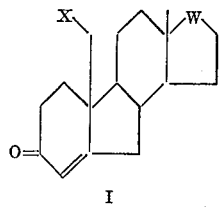

I wherein:

X is halo or p-toluenesulfonyloxy;
W is

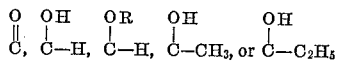

and
R is acyl of 2–10 carbon atoms, tetrahydropyranyl, or cyclopentenyl.

The term "halo" is intended, for purposes of the present disclosure, to include chloro, bromo, and iodo. The term "acyl" is intended to include those acyl groups derived from the carboxylic acids normally used to esterify steroidal alcohols. Among these acyl groups are acetyl, propionyl, butyryl, isobutyryl, heptanoyl, benzoyl, cyclopentylpropionyl, phenylpropionyl, and t-butylacetyl.

The compounds of the invention are prepared from the corresponding 19-hydroxy-B-nortestosterones by rection of the hydroxy group with p-toluenesulfonyl chloride in a base such as pyridine. The resulting intermediate 19-p-toluenesulfonate is then used for conversion to a 19-halo compound by reacting it with a lithium halide in dimethyl-formamide. When a 17β-hydroxy product, unalkylated at the 17α-position, is desired, a 17-keto starting material is used and the 17-hydroxy group is generated by reduction after the 19-halo group has been formed. Since this reduction simultaneously reduces the 3-keto group, this function is regenerated by oxidation with dichlordicyanobenzoquinone. When W is

the hydroxy group may be esterfied by reaction with an acyl halide or anhydride in the conventional manner. Tetrahydropyranyl or cyclopentenyl ethers are formed by reaction of the hydroxy compound with dihydropyran or cyclopentanone diethyl ketal.

The product compounds of the invention surprisingly possess androgenic activity. This property is most unexpected in view of the fact that B-norssteroids frequently possess antiandrogenic activity. The compounds are utilized in those instances where it is necessary or desirable to provide androgen replacement; they are administered in doses of 1–50 mg. daily. The compounds are formulated for use in the form of tablets or parenteral compositions containing 0.5–25 mg. of active compound according to conventional practice using standard pharmaceutical excipients.

The 19-hydroxy starting materials for preparing the the compounds of the invention are disclosed in U.S. Patent 3,284,505 or are prepared by procedures disclosed therein.

The following examples are intended to illustrate the preparation of the compounds of the invention, but are not to be construed as limiting the scope thereof.

EXAMPLE 1

19-chloro-17α-methyl-B-nortestosterone

A mixture of 2.5 g. of 19-hydroxy-17α-methyl-B-nortestosterone, 10 ml. of pyridine, and 2.0 g. of p-toluenesulfonyl chloride is stirred at room temperature for 5 hours. The reaction mixture is poured into water, acidified with dilute HCl, and then extracted with ether. The ethereal solution is then washed successively with water, $NaHCO_3$, and water; dried; and then evaporated in vacuo to give 19 - p - toluenesulfonyloxy - 17α - methyl - B - nortestosterone.

A solution of this tosylate in 20 ml. of dimethyl formamide is warmed with 2.5 g. of LiCl on the steam bath for 5 hours. Water is added to a total volume of 100 ml., precipitating out the crude title product, which is filtered off and recrystallized from ethyl acetate. The melting point is 170–171°.

EXAMPLE 2

When the following starting materials are treated with p-toluenesulfonyl chloride in pyridine as described in Example 1, the corresponding intermediates are obtained:

Starting material: 19-hydroxy-17α-ethyl-B-nortestosterone
Intermediate: 19 - p - toluenesulfonyloxy-17α-ethyl-B-nortestosterone
Starting material:  19-hydroxy-B-norandrost-4-ene-3,17-dione
Intermediate:  19 - p - toluenesulfonyloxy-B-norandrost-4-ene-3,17-dione

EXAMPLE 3

When an equivalent amount of LiBr or LiI are substituted for the LiCl in Example 1, 19-bromo-17α-methyl-B-nortestosterone and 19-iodo-17α-methyl-B-nortestosterone, respectively, are formed.

EXAMPLE 4

When an equivalent amount of 19-p-toluenesulfonyloxy-17α-ethyl-B-nortestosterone and 19-p-toluenesulfonyloxy-B-norandrost-4-ene-3,17-dione are substituted for the 19-p-toluenesulfonyloxy-17α-methyl-B-nortestosterone in the second part of Example 1, 19-chloro-17α-ethyl-B-nortestosterone and 19-chloro-B-norandrost-4-ene-3,17-dione, respectively, are formed. Use of LiBr or LiI instead of LiCl results in the formation of the corresponding 19-bromo or 19-iodo compounds.

EXAMPLE 5

19-chloro-B-nortestosterone

To a stirred suspension of 1.05 g. of lithium aluminum hydride in 75 ml. of ether is added a solution of 1.88 g. of 19-chloro-B-norandrost-4-ene-3,17-dione in 50 ml. of tetrahydrofuran. The addition is carried out at room temperature, with stirring over a 15 minute period. The reaction mixture is then heated to reflux for two hours, cooled, treated with 5 ml. of water and filtered. Evaporation of the filtrate gives 19-chloro-B-norandrost-4-ene-3,17β-diol.

The crude diol is dissolved in 50 ml. of dioxane to which is added a solution of 2.5 g. of 2,3-dichloro-5,6-dicyanobenzoquinone in 50 ml. of dioxane. After eight hours at room temperature the precipitated hydroquinone is removed by filtration and the filtrate is evaporated to a residue which is dissolved in methylene chloride and passed through a column of 30 g. of alumina (III, Woelm). Evaporation of the eluate gives a residue which after recrystallization gives the title product.

Substitution of the 19-bromo or 19-iodo compounds for the 19-chloro compound in the above procedures gives the corresponding 19-bromo or iodo products.

EXAMPLE 6

19-chloro-B-nortestosterne acetate 1 g. of 19-chloro-B-nortestosterone is dissolved in 10 m. of pyridine and 5 ml. of acetic anhydride added. The mixture is allowed to stand at room temperature overnight and poured into water. The acetate product is isolated by filtration and then recrystallized.

Use of propionic anhydride, butyric anhydride, isobutyryl chloride, heptanoic anhydride, benzoyl chloride, cyclopentylpropionic anhydride, phenylpropionyl chloride, or t-butyl acetyl chloride gives the corresponding esters.

EXAMPLE 7

19-chloro-B-nortestosterone 1-cyclopentenyl ether

To 3 grams of 19-chloro-B-nortestosterone dissolved in 100 ml. of chloroform are added 5 mg. of p-toluenesulfonic acid and 5 ml. of cyclopentanone diethyl ketal. The reaction mixture is distilled for about 30 minutes, the residue is neutralized with ethanolic potassium hydroxide, and distillation is completed under reduced pressure. The residue is 19-chloro-17β-(1-ethoxycyclopentyloxy)-B-norandrost-4-en-3-one.

One gram of 19-chloro-17β-(1-ethoxycyclopentyloxy)-B-norandrost-4-en-3-one is heated in an oil bath at 190–200° C. for 70 minutes in the presence of a drop of quinoline. The residue is taken up in methanol, filtered, and crystallized from methanol to produce the title product.

EXAMPLE 8

19-chloro-B-nortestosterone 2-tetrahydropyranyl ether 1 g. of 19-chloro-B-nortestosterone is heated at reflux with an excess of dihydropyran in benzene in the presence of a trace of p-toluenesulfonic acid. Evaporation gives the title product.

I claim:

1. A compound of the formula

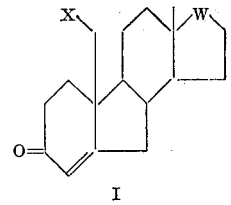

wherein:
X is chloro,
W is

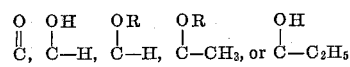

and
R is acetyl, propionyl, butyryl, isobutyryl, heptanoyl, benzoyl, cyclopentylpropionyl, phenylpropionyl, t-butylacetyl, tetrahydropyranyl, or cyclopentenyl.

2. A compound as claimed in claim 1, where W is

being the compound 19-chloro-17α-methyl-B-nortestosterone.

3. A compound as claimed in claim 1, where W is

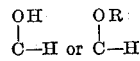

4. A compound as claimed in claim 3, where W is

being the compound 19-chloro-B-nortestosterone.

References Cited

UNITED STATES PATENTS 3,101,356 8/1963 Bowers _____ 260—397.4
3,072,681 1/1963 Kerwin _____ 260—586

LEON ZITVER, Primary Examiner

G. A. SCHWARTZ, Assistant Examiner

U.S. Cl. X.R.

260—345.9, 456, 468, 476, 488, 999